Patented May 25, 1943

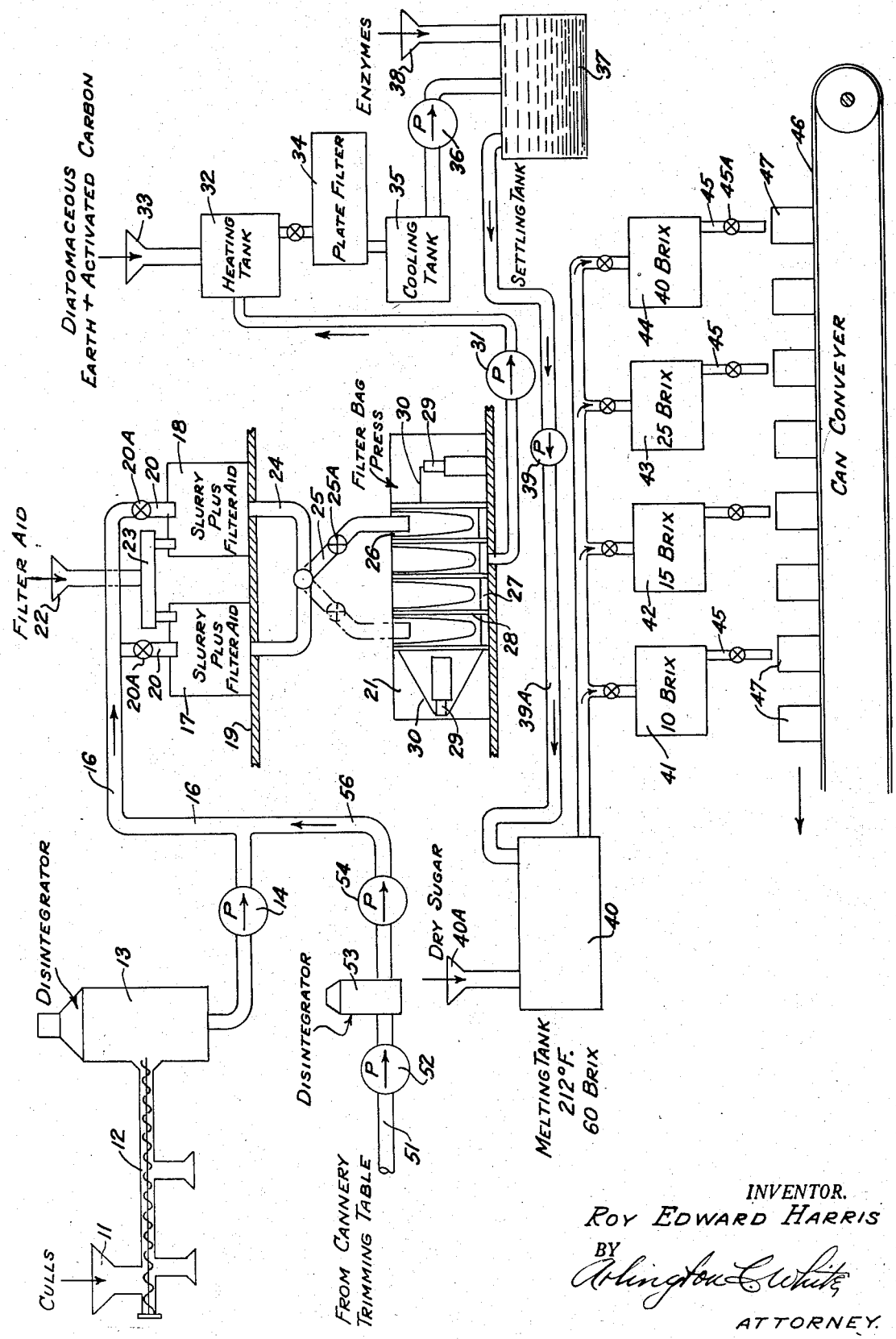

2,320,036

UNITED STATES PATENT OFFICE 2,320,036

PROCESS OF PRODUCING NATURAL FRUIT JUICES AND OF ELIMINATING CANNERY WASTE

Roy Edward Harris, San Jose, Calif.

Application December 14, 1940, Serial No. 370,172

1 Claim. (Cl. 99—105)

The invention, in general, relates to fruit and vegetable cannery practice. More particularly, the invention relates to the provision of natural fruit syrups of desired sugar content values for addition to canned fruit, as well as of producing natural vegetable juices for canned vegetables.

Those engaged in large scale canning of fruits and vegetables have long been aware of the considerable losses of natural juices that occur during a canning season in an appreciably large proportion of fruit and vegetable canneries throughout the country. The passive disregard of these losses has been due to a large extent to the lack of availability of suitable, economical equipment and methods of recovering such juices. Moreover, the losses have not, until comparatively recent years, been deemed important because the public generally has heretofore accepted canned fruit products containing straight sugar solution syrups, or canned vegetable products containing synthetic vegetable juices. However, with the advent on the market of specially prepared natural fruit juices or syrups at relatively low prices for use in the canning of fruits, the public has come more and more to demand the presence of natural fruit syrups in all canned fruit products. The present invention is directed to the utilization of otherwise wasted material for obtaining such natural fruit and vegetable juices.

A primary object of the invention is to provide a substantially continuous, straight run process for the recovery, purification and treatment of natural fruit juices from cannery waste or culls to afford natural fruit juices having a sugar content of desired value and free of adulteration.

Another object of the present invention is to provide a process of the indicated nature which is characterized by its simplicity and ease of adaptation to conventional cannery practice.

A still further object of the invention is to provide a process of the aforementioned character which does not appreciably increase operating costs in the cannery and which affords sufficient yield of natural fruit or vegetable juices in a comparatively short period of time to more than offset the expense of installation of equipment employed in my improved process.

Another object of the invention is to provide improved means and methods in fruit and vegetable cannery practice for obtaining highest values from a given quantity of fruit or vegetable processed.

The foregoing and other objects are attained by following the method hereinafter described, which is a preferred process for handling such fruits as peaches, apricots, apples and the like. The accompanying drawing diagrammatically depicts equipment utilized in such preferred process but it is to be understood that I am not to be limited to the precise equipment illustrated and described, nor to the precise arrangement thereof as shown, as my invention, as defined in the appended claims, can be embodied in a plurality and variety of forms and can be carried out in a plurality and variety of ways.

Referring to the drawing:

The single view is a flow sheet of my preferred process for the production, purification and treatment of juices from cannery waste and culls.

While the process of my invention is entirely suitable and adaptable to the production of natural fruit juices from a variety of different kinds of fruit as well as the recovery of vegetable juices, the process has been especially worked out and the equipment designed for and applied to the recovery of natural fruit juices of peaches and apricots and I shall, accordingly, describe and allude to the process in that environment.

It is to be observed, with reference to the flow sheet depicted in the annexed drawing, that the process is adapted to be carried out with respect to both culls and cannery waste simultaneously or with respect to either culls or cannery waste, as desired; since the change-over from one to the other can be made readily.

In accordance with my invention, and with reference to the recovery of natural fruit juices from the culls of peaches or apricots, I provide a hopper 11 into which the culls may be disposed for feeding the same to a conveyor 12 supported with its inlet end beneath the outlet of the hopper. Any suitable prime mover can be employed for operating the conveyor 12, such as a motor, together with a belt and pulley drive or a chain and sprocket drive therefrom, all not shown. The outlet end of conveyer 12 terminates adjacent to a disintegrator 13 which has an outlet in communication with a pipe connected to the inlet of a pump 14. Preferably, I employ a disintegrator of the type disclosed and claimed in Letters Patent No. 2,082,419, granted to Carl A. Reitz, which effects the reduction of the culls to a slurry consisting of fruit pulp, skins and comminuted pits; it being understood that any other disintegrating or macerating means or equipment may be utilized in this operation. The pump for moving such reduced culls preferably is of the positive displacement or plunger type in view of the nature of the slurry produced by the disintegrator.

The outlet of pump 14 is connected to a suitable conduit 16 leading to a pair of tanks 17 and 18, or more if desired, which are preferably supported at an elevation, such as on a platform 19, in order to effect a gravity flow of the slurry therefrom; and I provide a pair of pipe sections 20 leading from conduit 16 to each of the tanks 17 and 18, the pipe sections being conveniently provided with standard manually operable valves 20A for controlling slurry flow to the tanks. Mounted below the tanks 17 and 18, such as on the floor of the cannery, is one or more specially designed and specially operable filter bag presses 21, such filter bag presses preferably being of the type disclosed and claimed in my co-pending application for Letters Patent, Serial No. 354,952, filed August 31, 1940, and entitled "Filter press and control mechanism therefor."

In order that juices may be extracted or expressed more effectively and expeditiously in the operation of the presses, I preferably introduce into and intimately mix with the slurry conveyed to the tanks 17 and 18 a suitable filter aid having the capacity of assisting in the separation of the pulp, skins and comminuted pits from the juices. The filter aid that I preferably employ is porous diatomaceous earth, although any other suitable filter aid may be utilized, and I have obtained effective results by the introduction of approximately two parts by weight of the filter aid to approximately one hundred parts by volume of the slurry. To this end, I mount a hopper 22 for the filter aid above the tanks 17 and 18 with its outlet leading to a compartment or bin 23 having valve gates therein, not shown, together with a pair of outlet pipes leading from bin 23 to the tanks 17 and 18 for introducing regulated amounts of the diatomaceous earth into the slurry contained in the tanks. Suitable agitatators, not shown, are movably mounted within each tank 17 and 18 for effecting an intimate mix between the filter aid and the slurry. The mixtures from tanks 17 and 18 conveniently are transferred to the filter bag presses 21 through the medium of a header conduit 24 communicating with the outlets of the tanks and with a swingable spout 25 which is pivotally connected to the header conduit 24; the spout being conveniently provided with manually operable valves 25A for controlling flow of the mixture of slurry and filter aid to the filter bag presses. It is appreciated that the various porous bags 26 of the presses are successively filled by swinging the spout 25 thereover and opening a corresponding valve 25A. As described in the aforementioned co-pending application, the expressed juices from the slurry are received in tanks 27 disposed in the bottoms of the presses, and the bags are compressed through the medium of slidably and pivotally mounted press-boards 28 alternately arranged with respect to the bags and actuated or moved by hydraulically operated pistons 29, together with suitable cables 30 connecting the pistons to the press-boards. The fruit juice expressed from the slurry by the operation of the filter bag presses is somewhat cloudy in appearance but nevertheless is natural fruit juice except for slight traces of filter aid that may have passed through the bags with the juice, and traces of fruit pulp and skin.

In order to remove as much colloidal matter consisting of traces of skin and fruit pulp from the filtrate as is possible, I preferably deliver the expressed juices from tanks 27 of the filter bag presses 21 to a heating tank 32 where the filtrate is heated to substantially a boiling temperature after first intimately mixing therewith additional filter aid in the approximate proportions above stated; the filter aid in this instance preferably being a combination of diatomaceous earth and activated carbon and serving to precipitate from the expressed juices an appreciable amount of any colloidal matter that may have been left suspended in the filtrate. Any suitable heating means, such as electrical heating elements within the tank 32, may be utilized to bring the mixture of juices and filter aid to the desired elevated temperature. A suitable hopper 33 is mounted on tank 32 for delivering the filter aid to the tank, and conventional agitators, not shown, may be employed and movably mounted in the tank 32 for intimately mixing the filter aid in the juices. Thereafter, the heated mixture is delivered to a conventional plate filter press 34 for effectively removing precipitated colloidal matter from the mixture, and the expressed juices are then delivered to a cooling tank 35 for bringing the same to normal room temperatures. If desired, the mixture of slurry and filter aid can be heated when in tanks 17 and 18 and prior to delivery to the filter bag presses 21, and the tank 32 with its attendant equipment for heating the juices may be dispensed with; the filtrate from the bag presses being delivered directly to cooling tank 35, after first having been passed through the plate filter press 34. If this is done, activated carbon is mixed with the diatomaceous earth in compartment 23.

In accordance with my invention and in order to remove all traces of cloudiness of the juices as well as of all colloidal matter that may possibly remain in the juices after they have passed through the plate filter press 34, I subject the cooled juices to the action of an enzyme that is capable of effecting the precipitation of starches and other colloidal matter. To this end, the cooled juices are delivered by means of a suitable pump 36 to a settling tank 37 and the enzyme is introduced into the cooled juices through a hopper 38 mounted above the tank 37. Preferably, agitators of conventional type are movably mounted within the tank 37 to assist in the mixing of the enzyme with the juices. In practice, I have found that an enzyme commercially available under the trade-mark "Pectinol" is especially effective for the purpose stated when producing natural fruit juices from peach culls and cannery waste from peaches, the stated enzyme being added to the juices in the approximate proportions of five pounds of enzyme to approximately one thousand gallons of the juices. While not essential, but as an aid to insure the production of a clear product, I add small percentages of this enzyme to the slurry when in tanks 17 and 18, the enyzme being catalytic in action and assisting in the precipitation of starches and colloidal matter including pectin. The clear juices from settling tank 37 are delivered by means of a pump 39 and suitable conduits 39A to a melting tank 40 where dry sugar is added to the fruit juice through a hopper 40A supported above tank 40, and the product brought to the desired sugar content value, as measured on the Brix scale, in accordance with standard practice. Preferably, the juices in tank 40 are brought to a higher Brix value, say a Brix value of 60, more or less, than is ultimately desired in order that the same may be "cut" to different desired Brix values for addition to canned fruits. I have depicted diagrammatically a series of tanks 41, 42, 43 and 44 for storing juices having a sugar content value of 10 Brix; 15 Brix; 25 Brix and 40 Brix, respectively, which are the usual values of juices utilized for addition to fruits put up in cans. The outlets of the tanks 41 to 44 inclusive are conveniently connected to discharge pipes 45 having manually operable vaves 45A therein for controlling flow therethrough, the outlets of pipes 45 terminating above a can conveyer 46 upon which a plurality of cans 47 containing fruit are carried; the conveyer 46 being actuated in any conventional manner for moving the cans along under the various tanks for receiving a natural fruit juice augmented by sugar. Thus, should it be desired to add juices having a Brix sugar value of 10, 15, 25 or 40 to cans of fruit, it is only necessary to open a valve 45A of a corresponding discharge pipe 45 from the requisite tank 41 to 44 inclusive to fill the cans 47 as they are moved along.

In addition to the recovery of natural fruit juice from culls, the system of my present improvement includes means for treating cannery waste, such as cores, peelings and the like. To this end, a pipe 51 is provided for conducting cannery waste to which water has been added to assist the flow, the pipe 51 being connected to a suitable header, not shown, in communication with a plurality of canning tables at which operators work in peeling and coring the fruit, the peelings and cores being disposed in a trough of running water. A suitable pump 52 is interposed in the line 51 for moving the waste to a disintegrator or macerator 53 where the waste and added water is reduced to a slurry. After reduction of the waste by the disintegrator 53, the slurry is moved by means of a pump 54, together with a suitable conduit 56 and conduit 16, to the slurry tanks 17 and 18 mounted above the filter bag presses 21 as above described. The slurry is acted upon thereafter in the same manner as the slurry that may be obtained from fruit culls. It is clear that slurry may be obtained from cannery waste and culls simultaneously or from either alone, as desired. It also is clear that the process set forth is a straight run, substantially continuous method of handling material that otherwise would be lost or wasted.

Naturally, when handling vegetable juices from cannery waste or pulp, the steps of the foregoing process relating to the addition of dry sugar and the obtaining of sugar content values is dispensed with, the production of clear natural vegetable juices terminating at the cooling tank 35. Moreover, an enzyme utilized for treating fruit juices is not used for the vegetable juices, since the filter aid of diatomaceous earth or such material in combination with activated carbon, will suffice to precipitate out all foreign matter and colloidal material that may be suspended in the slurry, and will produce a clear natural juice.

It is to be understood that the appended claim is to be accorded a range of equivalent commensurate in scope with the advance made over the prior art.

I claim:

A substantially continuous, straight-run process of producing natural fruit juices from fruit culls or cannery waste for use in adding to canned fruits, said process consisting of the steps of disintegrating fruit culls or macerating cannery waste in the presence of water to provide a fruit slurry containing comminuted pulp, pits and juices, introducing and intimately mixing a filter aid in said slurry of comminuted pulp, pits and juices, straining the mixture under relatively high pressure to express substantially all juice from the mixture, boiling the expressed juices in the presence of diatomaceous earth and activated carbon to precipitate colloidal foreign matter and then subjecting the precipitate to high pressure to enhance further precipitation of colloidal matter, filtering the juices and cooling the same to normal room temperature, adding an enzyme to the cooled juices and thoroughly agitating the mixture, allowing the mixture to settle for clarifying the juices, and then adding dry sugar to the clarified juices to the extent desired as an addition to canned fruit.

ROY EDWARD HARRIS.